United States Patent [19]

Gourgue

[11] Patent Number: 5,564,075
[45] Date of Patent: Oct. 8, 1996

[54] METHOD AND SYSTEM FOR CONTROLLING THE POWER AT WHICH AN ACCESS PACKET IS SENT BY A MOBILE IN A MOBILE RADIO SYSTEM

[75] Inventor: Frédéric Gourgue, Paris, France

[73] Assignee: Alcatel N.V., Amsterdam, Netherlands

[21] Appl. No.: 207,687

[22] Filed: Mar. 9, 1994

[30] Foreign Application Priority Data

Mar. 9, 1993 [FR] France ............................ 93 02701

[51] Int. Cl.$^6$ ........................................ H04B 7/26
[52] U.S. Cl. ...................... 455/69; 455/63; 455/67.1; 455/127
[58] Field of Search ........................ 455/68, 69, 70, 455/126, 127, 88, 54.1, 52.1, 52.3, 67.1, 63, 65, 56.1, 33.1; 370/110.1

[56] References Cited

U.S. PATENT DOCUMENTS

| | | | |
|---|---|---|---|
| 5,003,619 | 3/1991 | Morris et al. | 455/69 |
| 5,128,965 | 7/1992 | Henriksson | 455/69 |
| 5,129,098 | 7/1992 | McGirr et al. | |
| 5,278,992 | 1/1994 | Su et al. | 455/52.1 |
| 5,295,152 | 3/1994 | Gudmundson et al. | 455/33.1 |

FOREIGN PATENT DOCUMENTS

| | | |
|---|---|---|
| 2229609 | 9/1990 | United Kingdom . |
| WO9209156 | 5/1992 | WIPO . |

OTHER PUBLICATIONS

Japanese Patent Abstract JP5075571 dated May 26, 1993.
French Search Report FR 9302701.

*Primary Examiner*—Reinhard J. Eisenzopf
*Assistant Examiner*—Doris To
*Attorney, Agent, or Firm*—Sughrue, Mion, Zinn, Macpeak & Seas

[57] ABSTRACT

In a method of controlling the power at which an access packet is transmitted by a mobile on an access channel to a base transceiver station of a mobile radio system, the base transceiver station transmitting a broadcast channel regularly, the base transceiver station transmits on the broadcast channel a power indication representing the transmit power of the broadcast channel. At the mobile the power received on the broadcast channel is measured and the measured power is compared with the transmit power indicated by the transmit power indication on the broadcast channel to deduce an estimated propagation loss from the mobile to the base transceiver station. An optimal transmit power for the access packet is determined on the basis of the estimated propagation loss and parameters of the mobile radio system.

14 Claims, 1 Drawing Sheet

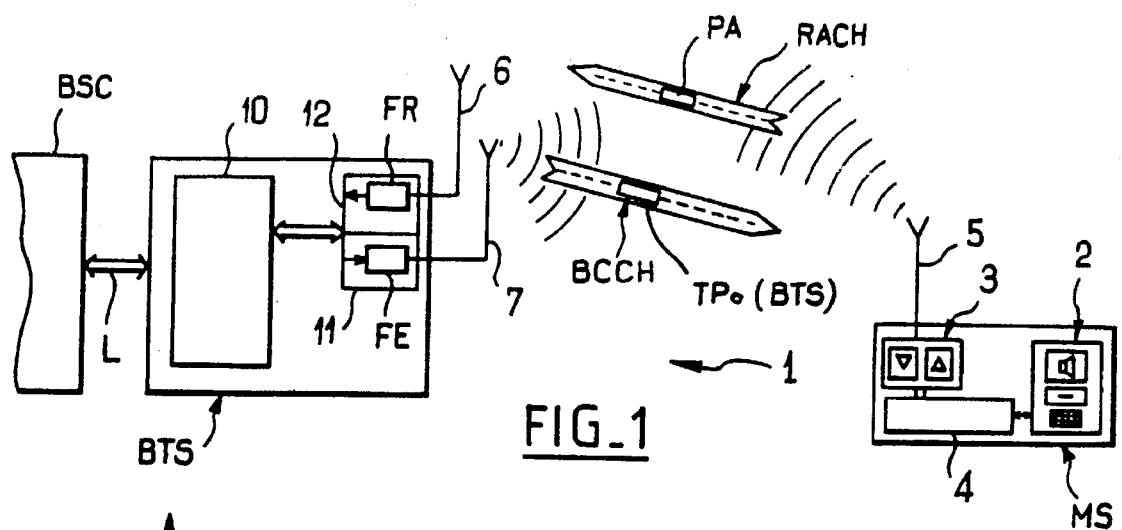
FIG_1
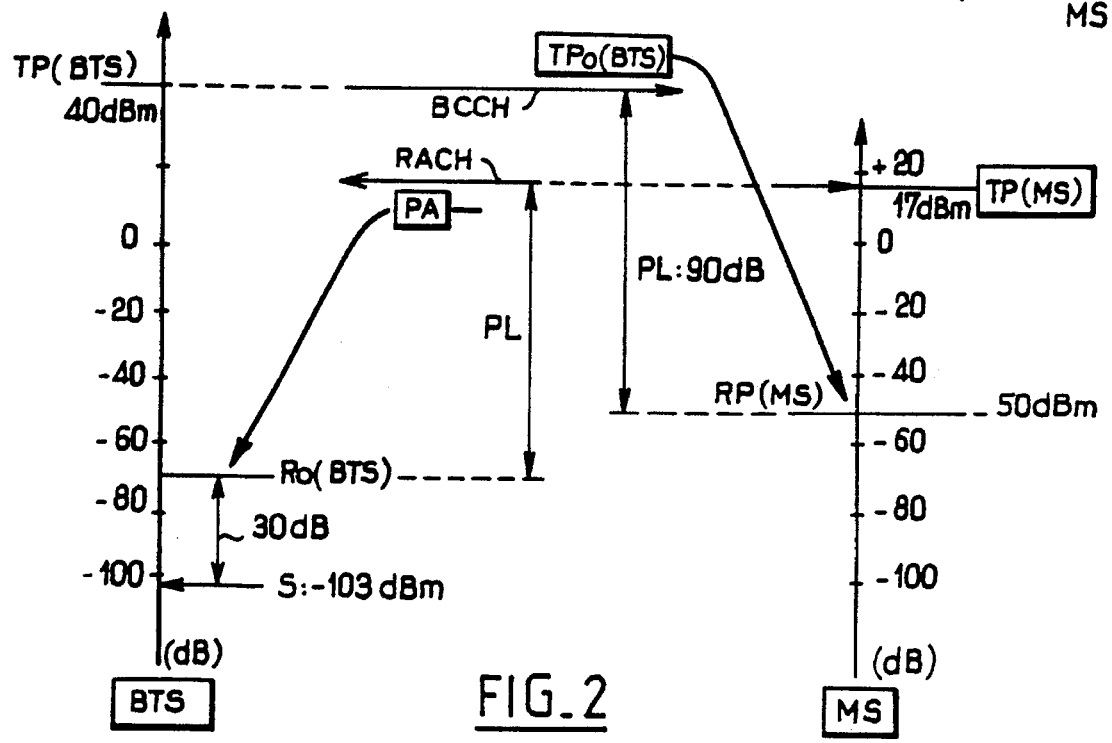
FIG_2
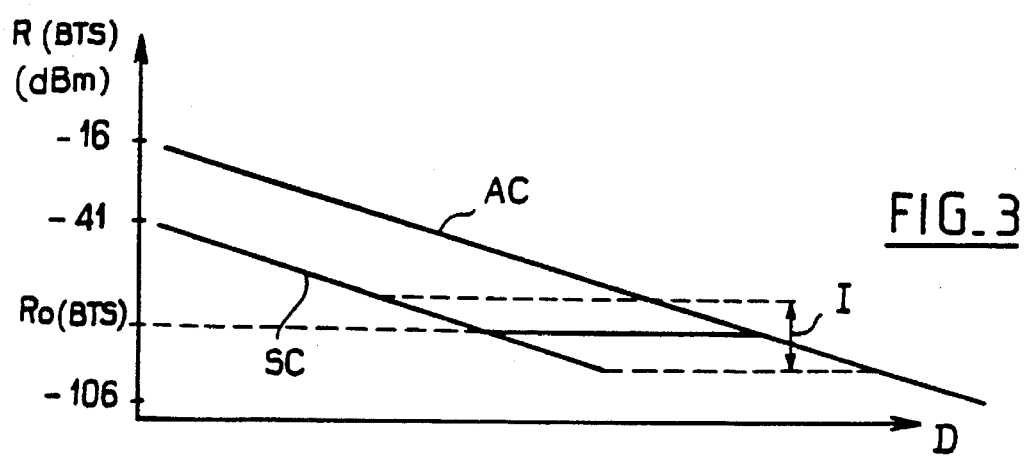
FIG_3

METHOD AND SYSTEM FOR CONTROLLING THE POWER AT WHICH AN ACCESS PACKET IS SENT BY A MOBILE IN A MOBILE RADIO SYSTEM

BACKGROUND OF THE INVENTION

1. Field of the Invention

The present invention concerns a method of controlling the power at which an access packet is transmitted by a mobile in a mobile radio system.

It also concerns a mobile radio system using this method.

2. Description of the Prior Art

Experience shows that in mobile radio systems the proportion of time for which a mobile is communicating with a base transceiver station is usually low. The mobile has to transmit only in the following situations:

during a call, whether this originates from the mobile or from the base transceiver station;

during exchanges of signalling information between calls when a mobile signals its presence or its location.

When any such period of activity is initialized the mobile must send a first message, called the access packet, without knowing in advance the attenuation with which it will arrive at the base station. The access packet is therefore transmitted at a power level dependent only on the maximal power rating of the mobile, possibly subject to a power limit broadcast by the base station for all mobiles in its coverage area.

Signal attenuation in a mobile radio system can be modelled by means of two components, as described in "Mobile Cellular Telecommunications Systems" by W. C. LEE, McGRAW-HILL International Editions, 1990:

local attenuation, or fading according to a lognormal law, which depends on the propagation environment and the distance between the base station and the mobile, called hereinafter the "propagation loss";

Rayleigh fading caused by interference resulting from multiple propagation paths and fluctuating much faster than local attenuation.

The power of the signal received by the base station therefore varies considerably with the position of the mobile in the coverage area. The receiver of the base station must therefore be designed to have a very wide input dynamic range, which in practice raises major problems. Input dynamic ranges in excess of 100 dB are frequently used, for example. The downstream stages must sometimes be duplicated. Several systems with a smaller dynamic range are then connected in parallel to cover the overall requirement.

This very wide dynamic range is unfortunately needed only for the access packet, as the base station can estimate the level of the received signal and respond by indicating to the mobile the transmit power to use to achieve a high quality link without using unnecessarily high power.

An object of the present invention is to remedy these drawbacks by providing a method for controlling the power at which an access packet is transmitted by a mobile such that the input dynamic range of the base transceiver station receiver can be reduced.

SUMMARY OF THE INVENTION

The invention consists in a method of controlling the power at which an access packet is transmitted by a mobile on an access channel to a base transceiver station of a mobile radio system, said base transceiver station transmitting on a broadcast channel regularly, wherein:

at the base transceiver station the broadcast channel transmits a power indication representing the transmit power of said channel;

at the mobile the power received on said channel is measured, the measured power is compared with the transmit power indicated by the transmit power indication on the broadcast channel to deduce an estimated propagation loss from said mobile to said base transceiver station, and an optimal transmit power for said access packet is determined on the basis of the estimated propagation loss and parameters of said mobile radio system.

The method according to the invention thus enables the mobile to optimize the power at which the access packet is transmitted. The constraints in respect of the base station receivers are therefore much less severe, which helps to simplify their design and reduce their cost. Additionally, the method according to the invention offers better use of the electrical energy stored in the mobiles and can reduce interference generated by the mobiles.

In another aspect the invention consists in a mobile radio system comprising a plurality of base transceiver stations communicating with a set of mobiles, each base transceiver station being adapted to transmit regularly on a broadcast channel, implementing the method as defined above, wherein at least one of said base transceiver stations is adapted to transmit on said broadcast channel an indication of the power transmitted on said channel and at least one mobile in the access phase in a cell managed by said base transceiver station comprises means for measuring the power at which said broadcast channel is received, means for comparing the measured power with the transmitted power and supplying an estimate of the propagation loss between said mobile and said base transceiver station, and means for adjusting the power at which an access packet is transmitted to an optimal transmit power level calculated from the estimated propagation loss and parameters of said system.

Other features and advantages of the invention emerge from the following description given by a way of non-limiting example with reference to the appended drawings.

BRIEF DESCRIPTION OF THE DRAWINGS

FIG. 1 is a diagram showing a mobile entering a cell of a base transceiver station using the method according to the invention.

FIG. 2 shows two power scales respectively associated with a base transceiver station and a mobile representing a practical embodiment of the method according to the invention.

FIG. 3 shows the consequences of an inaccurate estimate of the propagation loss on the power received by the base transceiver station.

DETAILED DESCRIPTION OF THE PREFERRED EMBODIMENT'

The power control method according to the invention is explained in the context of its application to digital mobile radio systems of the GSM ("Global System for Mobile Communications") or TETRA ("Trans European Trunk RAdio") type. FIG. 1 is used to explain how the method of the invention is implemented when a mobile MS enters a cell managed by a base transceiver station BTS. In the case of a GSM system, for example, the base transceiver station BTS can be connected to a base station controller BSC by a digital link L which can be of the ABIS type, for example.

Consider, for example, a configuration in which the base transceiver station BTS has separate transmit and receive antennas 7, 6 and the mobile MS entering the cell has a single antenna 5, as is the case with virtually all mobiles. The base transceiver station BTS usually has a transmitter unit 11 connected to transmit antenna 7 and a receiver unit 12 connected to the receiver antenna 6, these two units being connected to a baseband processor unit and incorporating appropriate filter means.

The mobile MS has a transmit-receive unit 3 connected to the shared antenna 5 and to a processor unit 4. In the case of a mobile radio system, the processor unit is connected to user interface equipments, including a loudspeaker, a microphone and a keypad. However, the method according to the invention applies equally well to data mobiles which have only a keypad.

Digital mobile radio systems have a "Broadcast Channel" (BCCH) on which system information messages are regularly broadcast. This broadcast channel (BCCH) is transmitted at all times in the GSM system but in a TETRA system can be intermittent within a data cell. In either case, transmission on this BCCH channel is at a constant power level set by the system operator. The method according to the invention provides for the broadcasting on this channel of an additional message TPo(BTS) indicating the carrier transmit power, to which a corrective term described below can be added.

The mobile MS can therefore determine the attenuation of the messages reaching it by comparing the power at which the messages are received (possibly after averaging) with the power with which they were transmitted. It can then transmit on the "Random Access Channel" (RACH) an access packet PA which is received and processed by the base transceiver station BTS.

Averaging eliminates some Rayleigh fading and extracts the attenuation due to the propagation loss. This avoids estimates falsified by severe fading. The system can also be rendered resistant to estimation errors.

The estimate is for the attenuation in the direction from the base station to the mobile, but this is nevertheless a good estimate of the propagation attenuation in the opposite or return direction from the mobile MS to the base station BTS if the frequencies used to transmit and receive are not too dissimilar and averaging is applied. Averaging eliminates any fast fluctuations on the propagation channel such as Rayleigh fading, for example. The optimal transmit power TPo(MS) is then dependent on a number of system parameters which can be either fixed or transmitted by the base station (BTS) on the broadcast channel BCCH. These parameters can include:

the sensitivity of the base station BTS;

a margin to be used to calculate the optimal transmit power (TPo(MS)), to allow for some uncertainty in the power measurement or to compensate for any discrepancy in the link balance between the uplink and downlink directions. The reasons for and a definition of this margin are explained in detail below.

Referring to FIG. 2, consider, for example, a system in which the sensitivity S of the base transceiver stations BTS is equal to −103 dBm, designed so that an access packet PA arrives on the access channel RACH at a power level that is if possible 30 dB above the sensitivity S, i.e. at a power level Ro(BTS) of −73 dBm. If it is assumed that the broadcast channel BCCH is transmitted regularly at a power TP(BTS) equal to 40 dBm, a mobile MS receiving this channel at a measured power level RP(MS) equal to −50 dBm, for example, will deduce that the attenuation is equal to:

$$40-(-50)=90 \ dB$$

The optimal transmit power TPo(MS) determined in one embodiment of the invention is therefore equal to:

$$90-73=17 \ dBm$$

These various operations can be carried out within the internal power control mechanism of the mobile in order to set the power at which the access packet PA is transmitted on the access channel RACH.

As an example of implementation of the method of the invention there is next described a link balance between a base transceiver station BTS and a mobile MS assuming that the mobile uses the same antenna to receive and transmit, which is the case in virtually all real-life applications. On the other hand, it is assumed that the base transceiver station BTS has separate transmit and receive antennas.

A feasible implementation of the method according to the invention is therefore based on the link balance represented in the following table:

|  | Base station BTS | Mobile MS |
|---|---|---|
| Transmit power | broadcast channel BCCH    TP(BTS) | access channel TP(MS) |
| cable and filter losses | B(BTS) | B(MS) |
| transmit antenna gain (dBi) | C(BTS) | C(MS) |
| equivalent isotropically radiated power (EIRP) | TP(BTS) − B(BTS) + C(BTS) | TP(MS) − B(MS) + C(MS) |
| propagation loss | PL | PL |
| signal level at receive antenna | TP(BTS) − B(BTS) + C(BTS) − PL | TP(MS) − B(MS) + C(MS) − PL |
| receive antenna gain | G(BTS) | C(MS) |
| receive cable losses | H(BTS) | H(MS) |
| receive input power | RP(BTS) = TP(MS) − B(MS) + C(MS) − PL + G(BTS) − H(BTS) | RP(MS) = TP(BTS) − B(BTS) + C(BTS) − PL + C(MS) − H(MS) |

Definition of terms:

TP(MS): the transmit power used by the mobile MS to transmit the access packet PA on the access channel (RACH);

TP(BTS): the transmit power used by the base transceiver station BTS and signalled on the broadcast channel BCCH;

RP(MS): the power level measured by the mobile MS;

RP(BTS): the power level received by the base transceiver station BTS;

B(BTS) and B(MS): the power dissipated in the respective transmit filters and cables of the base transceiver station BTS and the mobile MS;

C(BTS) and C(MS): the base transceiver station BTS transmit antenna gain and the mobile MS transmit-receive antenna gain;

G(BTS): the base transceiver station BTS transmit and receive antenna gains;

H(BTS) and H(MS): the losses in the respective receive cables and connections of the base transceiver station BTS and the mobile MS.

Note that the antenna gain G(BTS) can allow for the gain due to antenna diversity in cases where a plurality of receive antennas are used.

An estimate of the propagation loss PL by the mobile MS can be expressed in terms of the power RP(MS) received by the mobile MS given in the last line of the above table:

$$PL=TP(BTS)-RP(MS)+(C(MS)-H(MS))+(C(BTS)-B(BTS))$$

If Ro(BTS) represents the required signal level at the base transceiver station BTS receiver antenna connector, the optimum power for transmitting the access packet PA is then:

$$TPo(MS)=Ro(BTS)+(B(MS)-C(MS))+(H(BTS)-G(BTS))+PL$$

Inserting the expression for the propagation loss PL into the above equation yields:

$$TPo(MS)=Ro(BTS)+TP(BTS)+(H(BTS)-B(BTS))+(C(BTS)-G(BTS))+(B(MS)-H(MS))-RP(MS)$$

The term (H(BTS)−B(BTS))+(C(BTS)−G(BTS)), referred to hereinafter as the base component term (x), represents the margin necessary to allow for the internal transmit-receive structure of the base station. It can be measured beforehand, defined or calculated, and is used to establish a corrected transmit power TPo(BTS) explained below. If the base transceiver station BTS uses the same antenna to transmit and receive, then the term x reduces to x=(H(BTS)−B(BTS)) and therefore to the difference between the power losses in the receive and transmit cables and filters, respectively, at the base station.

The term (B(MS)−H(MS)), referred to hereinafter as the mobile component (y), represents the difference between the cable losses in the receiver unit of the mobile MS and the cable and filter losses in the transmitter unit of said mobile MS. As the same antenna is used to transmit and receive the cables are the same. The difference therefore relates only to the filter losses F(MS) which in practice are in a range [1.5±1.5] dB.

In conclusion, the overall margin used to calculate the optimal transmit power for the access packet PA can be expressed as follows:

in the case of separate transmit and receive antennas at the base transceiver station BTS, or of additional gain due to the use of antenna diversity:

$$X=(H(BTS)-B(BTS))+(C(BTS)-G(BTS))+F(MS),$$

in the case of a single base station antenna:

$$X=(H(BTS)-B(BTS)+F(MS)).$$

The optimal transmit power TPo(MS) for the access packet PA, controlled by the method according to the invention, can be expressed as follows:

$$TPo(MS)=Ro(BTS)+TPo(BTS)-RP(MS)+y,$$

where TPo(BTS) represents the corrected transmit power of the base transceiver station allowing for losses at the input filters and the cables (transmit and receive) and the receive and transmit antenna gain. Using x, the base component of the overall margin as defined above:

$$TPo(BTS)=TP(BTS)+x.$$

The required power to transmit the packet can be expressed as a function of the required receive power at the base station, the corrected power transmitted by the base station on the broadcast channel BCCH, the power received on this channel by the mobile MS and the margin to be allowed in calculating the power to cover uncertainty as to the power measurement and to compensate for any discrepancy in the link balance between the uplink direction (from the mobile MS to the base transceiver station BTS) and the downlink direction (from the base transceiver station BTS).

The optimal transmit power (TPo(MS)) for the access packet PA is then:

$$TPo(MS)=Ro(BTS)+TPo(BTS)-RP(MS)+y.$$

The variable y represents the margin component which allows for losses in the filter components of the mobile MS. Note that the base margin component x allowing for attenuation and gain differences at the base transceiver BTS is integrated into the corrected transmit power TPo(BTS).

The method according to the invention can be implemented in at least two different ways:

- the broadcast channel BCCH can broadcast simultaneously information indicative of the corrected transmit power TPo(BTS) and information indicative of the required receive power Ro(BTS); or

- the broadcast channel BCCH can broadcast information indicative of the corrected transmit power TPo(BTS) with the required receive power Ro(BTS) defined in the communication standard, this information then being resident in the control and processor means of the mobile MS.

The first option of broadcasting both power indications on the broadcast channel BCCH has the advantage of being more flexible, whereas the second option economizes in terms of usage of the broadcast channel BCCH.

The choice between these options may be conditioned by considerations of a practical nature as to the dynamic range to which the power of the mobile MS is set, as explained below.

Consider, for example, a practical situation in which the dynamic range to which the power of the mobile MS is set has a threshold at 15 dBm and goes up to the nominal transmit power of the mobile MS in increments of 5 dB. This means that the power at which the access packet PA is transmitted is set to the optimal transmit power (TPo(MS)) as calculated, of course, but in practice to the available power level nearest the optimal power.

In practice all mobiles inside a circle of minimum radius Rmin transmit their access packet at a power level of 15 dBm representing the minimum power threshold. Note that the minimum radius is made sufficiently large to avoid any risk of saturating the base transceiver station BTS. The receive equipment of the latter can therefore be designed to receive access packets from near mobiles at a threshold level of 15 dBm rather than the maximum level, as is usually the case in the prior art. This achieves a reduction equal to the difference between the possible maximal threshold and the minimal threshold which is subject to constraints as to the input dynamic range of the base transceiver station BTS receiver, which helps to simplify significantly the design of the receiver and to reduce the cost of the radio equipment. For example, the minimal threshold in a TETRA system is 15 dBm and the maximal threshold can be up to 40 dBm, representing an input dynamic range reduction of 25 dB.

The option whereby an appropriate value of the required power Ro(BTS) is predetermined achieves good system behavior. Consider, for example, a base transceiver station BTS sensitivity of −106 dBm and a required receive level of at least 20 dB to guarantee a good signal/noise ratio. The required input power is then −106+20=−86 dBm. Assuming an overall margin of 13 dB, made up of a margin component of 10 dB for the propagation loss estimate and a mobile component y of −3 dB to allow, among other things, for losses at the receive filter in the mobile MS, the final value of the required power Ro(BTS) is then −73 dBm.

For a base transceiver station BTS with a corrected transmit power TPo(BTS) equal to 46 dBm the mobile MS must reduce its transmit power to the 15 dBm threshold if the receive power of the mobile MS is:

$$RP(MS)=-73-15+46=-42 \ dBm,$$

which represents a propagation loss equal to:

$$46-(-42)=88 \ dB.$$

This level of propagation loss in practice represents a distance of 700 meters for a standard equipment used in the 400 MHz band. Inaccuracy in the estimate of the propagation loss would modify this distance by a few tens of meters, which would affect the power received by the base transceiver station BTS if the signal level is around −70 dBm, but would have no effect on the maximum power level received by the base station. What is more, because a large margin has been provided, the signal level received by the base station remains very high even if the estimated propagation loss is highly inaccurate. The overall performance of the system is therefore highly insensitive to the exact value of the required power Ro(BTS) at the input of the base transceiver station, as shown by the diagram in FIG. 3 which shows the base station receive power RP(BTS) as a function of the distance D between the mobile MS and the base station. A first straight line AC represents the attenuation of the receive power in the absence of power control. A second straight line SC represents the received power attenuation in the case where the power control method according to the invention is used. Inaccuracy in the estimated propagation loss has a limited impact I on the power actually received at the base station receiver input relative to the required receive power Ro(BTS).

It is therefore feasible to include in the communication standard a fixed required power value, around −73 dBm in this example. A higher value is feasible provided that there is no risk of saturating the base station.

The coding of the corrected power indication TPo(BTS) transmitted on the broadcast channel BCCH by the base transceiver station BTS in practice requires a small number of bits. For example, consider a dynamic range for the base transceiver station BTS power output equal to 26 dB, representing 14 dB of power class and 12 dB of power control, for example.

Of course, the invention is not limited to the examples just described and many modifications can be made to those examples without departing from the scope of the invention.

There is claimed:

1. A method of controlling a power at which an access packet is transmitted by a mobile on an access channel to a base transceiver station of a mobile radio system, said base transceiver station transmitting on a broadcast channel regularly, comprising the steps of:

a) transmitting at the base transceiver station, on the broadcast channel a power indication representing a transmitted power of said broadcast channel;

b) measuring at the mobile the power received on said broadcast channel;

c) comparing the measured power received with the transmitted power indicated by the transmitted power indication on the broadcast channel to deduce an estimated propagation loss from said mobile to said base transceiver station, and d) determining an optimal transmission power for said access packet on the basis of the estimated propagation loss and parameters of said mobile radio system.

2. A method according to claim 1, wherein said measured power is averaged before it is compared with said transmitted power.

3. A method according to claim 1, wherein the system parameters used to determine said optimal transmission power for said access packet include a receive sensitivity of said base transceiver station and an error compensation margin to be used in calculating said optimal transmission power.

4. A method according to claim 3, wherein said optimal transmission power for said access packet is determined from the equation:

$$TPo(MS)=TP(BTS)-RP(MS)+Ro(BTS)+x,$$

in which:

TP(BTS) is the power at which said broadcast channel is transmitted by said base transceiver station, RP(MS) is the received power as measured by said mobile, Ro(BTS) is a required receive power at said base transceiver station, and x is said margin for the calculation.

5. A method according to claim 3, wherein said optimal transmission power for said access packet is determined from the equation:

$$TPo(MS)=TPo(BTS)-RP(MS)+Ro(BTS)+y$$

in which:

TPo(BTS) is a corrected transmit power equal to the transmitted power of said broadcast channel increased by a first component of said margin representative of a link imbalance within said base transceiver station, RP(MS) is the received power as measured by said mobile, optionally after averaging, Ro(BTS) is a required receive power at said base transceiver station, and y is a second component of said margin allowing for receive losses at said mobile.

6. A method according to claim 5, wherein said broadcast channel broadcasts an indication of said required power at an input of said base transceiver station and an indication of said corrected transmit power.

7. A method according to claim 5, wherein said broadcast channel broadcasts an indication of said corrected transmit power, and said required power at an input of said base transceiver station is predefined in a standard for said mobile radio system.

8. A method according to claim 7, wherein before said mobile in an access phase transmits any access packet to said base transceiver station on said access channel, the optimal transmission power for said access packet is calculated from said corrected transmit power indication received on said broadcast channel, from the power received on said broadcast channel as measured by said mobile, and from an internally stored required receive power indication representing a predefined required receive power increased by said second margin component, according to the equation:

$$TPo(MS)=TPo(BTS)-RP(MS)+[R'o]Ro(BTS).$$

9. A method according to claim 5, wherein said corrected transmit power indication broadcast on said broadcast channel is coded by a predetermined number of bits such that a resulting control increment is sufficiently small in comparison to a nominal transmit power of said mobile.

10. A method according to claim 9, wherein the number of bits is three.

11. A method according to claim 5, as applied to a mobile using a single antenna to both transmit and receive, wherein said second margin component is greater than or equal to a predetermined estimate of receive filter losses in said mobile.

12. A method according to claim 5, as applied to said base transceiver station using a single antenna to both transmit and receive, wherein said first margin component is made greater than or equal to a predetermined estimate obtained at said base transceiver station of the difference between receive cable losses and a transmit cable and filter losses.

13. A mobile radio system, comprising: a plurality of base transceiver stations communicating with a set of mobiles, each base transceiver station being adapted to transmit regularly on a broadcast channel, implementing a method of controlling a power at which an access packet is transmitted by a mobile on an access channel to a base transceiver station of a mobile radio system, said base transceiver station transmitting on said broadcast channel regularly, wherein:

a) at the base transceiver station, the broadcast channel transmits a power indication representing a transmitted power of said channel;

b) at the mobile, the power received on said broadcast channel is measured;

c) the measured power is compared with the transmitted power indication of the broadcast channel to deduce an estimated propagation loss from said mobile to said base transceiver station, and d) an optimal transmit power for said access packet is determined on the basis of the estimated propagation loss and operating parameters of said mobile radio system, e) at least one of said base transceiver stations being adapted to transmit on said broadcast channel an indication of the power transmitted on said channel, and f) at least one mobile in an access phase in a cell managed by said at least one base transceiver station comprising means for measuring the power at which said broadcast channel is received, means for comparing the measured power with the transmitted power and supplying said estimate of the propagation loss between said mobile and said base transceiver station, and means for adjusting the power at which said access packet is transmitted to said optimal transmit power level calculated from the estimated propagation loss and parameters of said system.

14. A system according to claim 13 wherein said means for measuring the received power includes means for averaging a plurality of received power measurements.

* * * * *